Dec. 1, 1959  W. LODIGE ET AL  2,915,354
MOVABLE SERVING CUPBOARD
Filed June 7, 1957  2 Sheets-Sheet 1
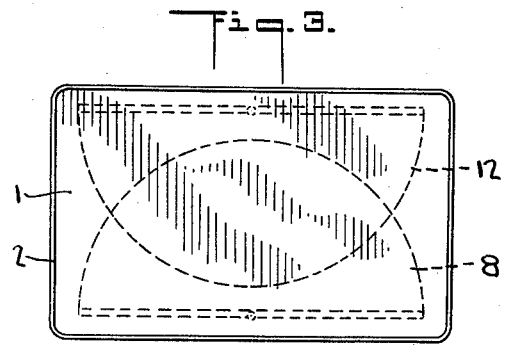
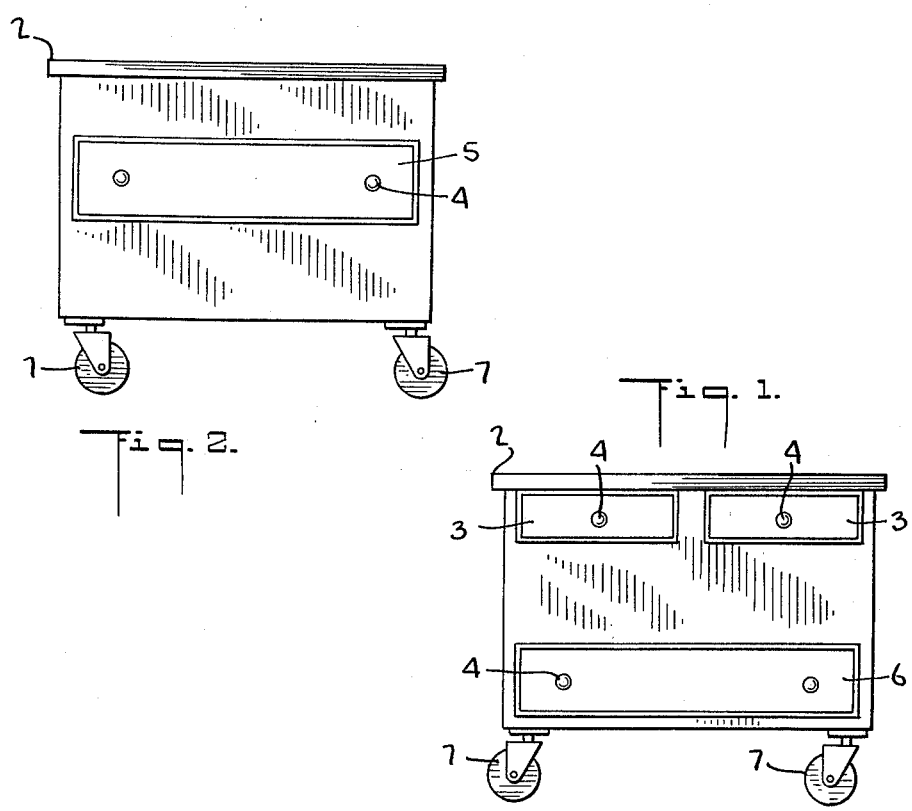
INVENTORS
WILHELM LODIGE
FRITZ LODIGE
BY  JOSEF LUCKE
AGENT Dec. 1, 1959   W. LODIGE ET AL   2,915,354
MOVABLE SERVING CUPBOARD
Filed June 7, 1957   2 Sheets-Sheet 2
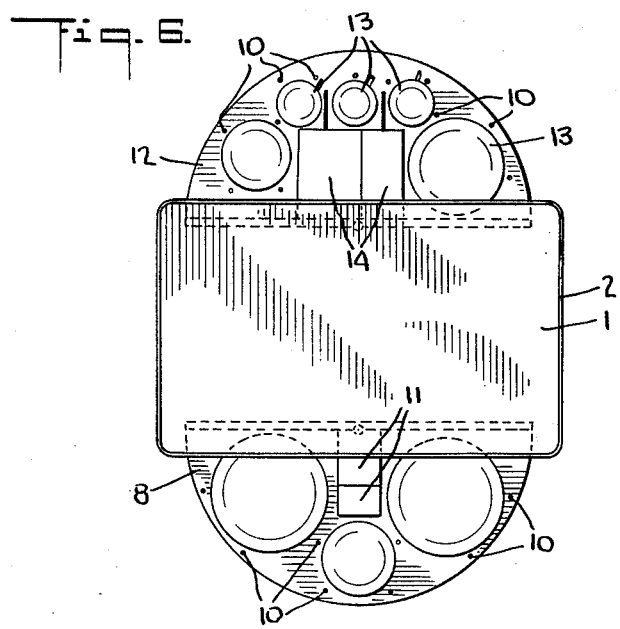
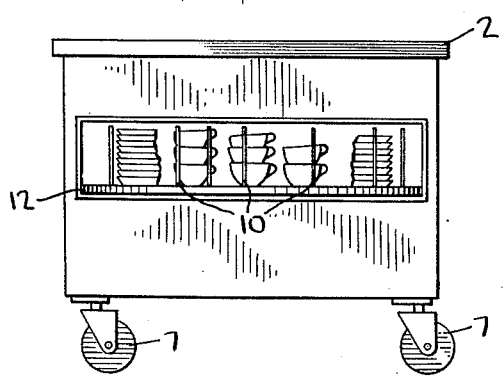
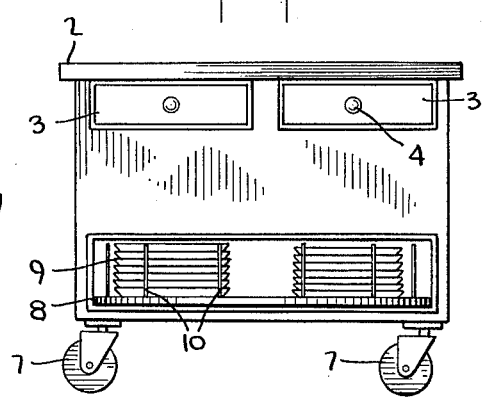
INVENTORS
WILHELM LODIGE
FRITZ LODIGE
BY JOSEF LUCKE
AGENT

United States Patent Office 2,915,354
Patented Dec. 1, 1959

2,915,354

MOVABLE SERVING CUPBOARD

Wilhelm Lodige, Fritz Lodige, and Josef Lucke, Paderborn, Germany

Application June 7, 1957, Serial No. 664,324

Claims priority, application Germany June 11, 1956

1 Claim. (Cl. 312—287)

This invention relates to a movable serving cupboard.

Tea and serving trolleys are known which allow food or drink to be stored on a top cover plate or on individual trays of the trolleys and then be brought to and served at meal-tables. There are also small tables which can be placed beside the main tables and from which food can be served. Such tea and food trolleys, however, are not suitable for storing crockery.

The present invention provides a movable serving cupboard comprising a top surface on which food and drink can be stood, compartments in which eating utensils can be kept, and in the compartments subdividing means which define subdivisions corresponding to the sizes and shapes of the utensils and which are so constructed that the utensils can readily be introduced into and removed from the subdivisions and are held securely when in the subdivisions. Such a cupboard can for example be mounted on castors and be moved about like a conventional tea or serving trolley and can also be used for the storage of utensils such as plates, cups, knives, forks and spoons, and salt, mustard, vinegar, pepper, and oil, which are necessary for breakfast or lunch. Hence the movable serving cupboard according to the invention replaces a small kitchen dresser. The movable serving cupboard according to the invention has the advantage of saving considerable labour. It is important for the house-wife to be helped in her work by useful gadgets, because modern progress and the fact that most wives work usually leave little time for housekeeping, and staff is no longer readily available.

The movable serving cupboard in accordance with the invention makes it easier to lay and clear the table and wash up and saves the house-wife many journeys. Cutlery, crockery and other utensils required for daily use can be placed in orderly fashion in the cupboard in accordance with the invention. The cupboard can be left anywhere in the kitchen or dining room and forms a desirable piece of furniture. The movable cupboard can alternatively stand in a built-in cupboard made to receive the movable cupboard.

In order to render it possible that the utensils can readily be introduced into and removed from the subdivisions and are held securely when in the subdivisions, the subdividing means in the compartments of the portable serving cupboard take conveniently the form of spaced, lattice-like parts or, advantageously, of appropriately disposed rods projecting upwardly, i.e. vertically, from the base of each compartment. The rods are rigidly secured to the compartment bases.

In a preferred embodiment, the movable serving cupboard has two compartments, at different heights, pivoted about opposite walls of the cupboard and movable outwardly about the respective pivots. The cupboard can also have additional compartments, for example for cutlery cases. The subdividing means are again so constructed that the introduction and removal of the individual items of cutlery and crockery are not hindered.

The movable serving cupboard can be used in the following ways:

To lay a table or serve a meal, the cupboard is moved close up to the table and all the necessary utensils are removed from the cupboard. Previously, the foods ready for serving have been placed on the top tray and carried on the serving cupboard to the table in one journey. After the table has been laid, the foods are served. After the meal the dirty crockery and cutlery is placed on the top tray and moved away to the washing-up sink. After washing up, the cutlery and crockery is returned to the cupboard and the latter is then returned to its original position.

A preferred embodiment of the invention is illustrated in the accompanying drawings, in which:

Fig. 1 is a side elevation of a movable serving cupboard wagon with drawers and an outwardly pivotable compartment with subdivisions for eating utensils, Fig. 2 is a side elevation showing one compartment, with utensils for coffee and breakfast, pivoted outwardly.

Fig. 3 is a plan view showing, in chain lines, how the two pivotable compartments for coffee utensils and eating utensils are disposed when in the inwardly pivoted position, Fig. 4 is a side elevation showing the compartment for eating utensils pivoted outwards, Fig. 5 is a side elevation showing the compartment for coffee and breakfast utensils pivoted outwards, and Fig. 6 is a plan view showing the compartments for eating utensils and for coffee or breakfast utensils both pivoted outwards.

In the drawings, reference number:

(1) is a top tray on which prepared foods can be placed when the movable cupboard is brought to the table and on which dirty crockery can be placed for transport to the sink.
(2) is a lateral lip around the tray 1.
(3) are drawers for cutlery cases and tablecloths.
(4) are handles on the drawers and on pivotable compartments;
(5) is a pivotable compartment for coffee and breakfast utensils;
(6) is a pivotable compartment for lunch utensils;
(7) are castors;
(8) is the base of an outwardly pivotable compartment with utensils on it for lunch;
(9) is utensils for lunch;
(10) are holding and bounding rods acting as the means for subdividing the pivoting compartments, the rods being rigidly secured to the compartment bases;
(11) are cruet compartments;
(12) is the base of an outwardly pivoted compartment on which stand utensils for coffee or breakfast;
(13) is utensils for coffee or breakfast;
(14) are compartments for, inter alia, sugar, kitchen forks, and coffee spoons.

What we claim is:

In a movable dish cabinet and serving tray, the combination of a cabinet structure having two vertical side walls and a horizontal top wall constituting the serving tray, a first compartment pivotally mounted in one of said side walls to be pivotal from a closed position flush with the side wall to an open position outwardly projecting from said side wall, a second compartment pivotally mounted in the other one of said side walls above said first compartment and also pivotal from a closed position flush with the other side wall to an open position outwardly projecting from the other side wall, each compartment consisting of a straight vertical end wall and a semicircular bottom wall, pivot means supporting the midpoints of said straight vertical end walls of the compartments in a respective one of said vertical side walls, a plurality of spaced vertical rods being rigidly mounted in the bottom wall and assembled in groups of rods defining vertical retaining means for wishes and like utensils of different sizes and shapes, and wheels attached to the bottom of the cabinet.

References Cited in the file of this patent

UNITED STATES PATENTS

| Des. 92,020 | Rodstein et al. | Apr. 17, 1934 |
| 2,315,862 | Ledbetter et al. | Apr. 6, 1943 |

FOREIGN PATENTS

| 229,384 | Switzerland | Oct. 31, 1943 |
| 611,834 | Great Britain | Nov. 4, 1948 |